United States Patent
Halahmi et al.

(10) Patent No.: US 7,922,932 B2
(45) Date of Patent: *Apr. 12, 2011

(54) REACTIVE FINE PARTICLES

(75) Inventors: Izhar Halahmi, Hod Hasharon (IL); Jacob Mozel, Kfar Saba (IL); Ran Vilk, Kiron (IL)

(73) Assignee: Camtek Ltd., Migdal Ha'emek (IL)

(*) Notice: Subject to any disclaimer, the term of this patent is extended or adjusted under 35 U.S.C. 154(b) by 0 days.

This patent is subject to a terminal disclaimer.

(21) Appl. No.: 12/637,115

(22) Filed: Dec. 14, 2009

(65) Prior Publication Data

US 2010/0093910 A1     Apr. 15, 2010

Related U.S. Application Data

(60) Continuation of application No. 11/757,175, filed on Jun. 1, 2007, now Pat. No. 7,632,423, which is a division of application No. 10/762,508, filed on Jan. 23, 2004, now Pat. No. 7,485,242.

(51) Int. Cl.
| | |
|---|---|
| C09K 3/00 | (2006.01) |
| C08G 59/50 | (2006.01) |
| C08G 59/56 | (2006.01) |
| C08L 63/00 | (2006.01) |

(52) U.S. Cl. ......... 252/182.13; 252/182.14; 252/182.26; 252/182.29; 252/182.32; 523/400; 523/402; 523/414; 523/440

(58) Field of Classification Search .................. None
See application file for complete search history.

(56) References Cited

U.S. PATENT DOCUMENTS

| | | | | |
|---|---|---|---|---|
| 3,288,747 | A * | 11/1966 | Sussman | 523/200 |
| 3,335,112 | A * | 8/1967 | Marks | 528/90 |
| 3,485,917 | A * | 12/1969 | Van Der Eijcken et al. | 514/400 |
| 3,876,604 | A * | 4/1975 | Caruso et al. | 524/769 |
| 4,345,936 | A * | 8/1982 | Thibault et al. | 504/277 |
| 5,009,982 | A * | 4/1991 | Kamayachi et al. | 430/280.1 |
| 5,478,885 | A * | 12/1995 | Masse et al. | 525/92 H |
| 5,480,957 | A * | 1/1996 | Muroi et al. | 528/87 |
| 5,702,820 | A * | 12/1997 | Yokoshima et al. | 428/413 |
| 6,210,862 | B1 * | 4/2001 | Day et al. | 430/280.1 |
| 6,235,865 | B1 * | 5/2001 | Shimizu et al. | 528/89 |
| 6,319,652 | B1 * | 11/2001 | Akutsu et al. | 430/280.1 |
| 6,432,612 | B1 * | 8/2002 | Hamada et al. | 430/280.1 |
| 6,492,437 | B1 * | 12/2002 | Cipullo et al. | 523/456 |
| 6,822,341 | B1 * | 11/2004 | Ahsan | 257/793 |
| 7,485,242 | B2 * | 2/2009 | Halahmi et al. | 252/182.13 |
| 2004/0230008 | A1 * | 11/2004 | Correll et al. | 525/326.2 |
| 2006/0047014 | A1 * | 3/2006 | Hopper et al. | 523/160 |
| 2007/0246686 | A1 * | 10/2007 | Halahmi et al. | 252/182.13 |

* cited by examiner

Primary Examiner — Joseph D Anthony
(74) Attorney, Agent, or Firm — Reckes Patents

(57) ABSTRACT

A method for producing reactive fine particles, includes: admixing at least one latent curing agent selected from the group consisting of a urea derivative, an imidazole, a dicyaniamide (DICY), a mixture of any one or more thereof, and a precursor thereof, in a solvent to form a clear solution; spraying the clear solution onto at least one inorganic inert particle selected from the group consisting of a metal oxide, a mineral filler, a natural filler, and a mixture of any one or more thereof, the at least one inorganic inert particle having a specific surface area in the range of about 10 to about 50 m2/g; and removing the solvent to form reactive fine particles that includes a core of inert material coated by a coating layer that includes the at least one latent curing agent.

6 Claims, 2 Drawing Sheets

REACTIVE FINE PARTICLES

CROSS REFERENCE TO RELATED APPLICATIONS

This application is a continuation of U.S. patent application Ser. No. 11/757,175, filed on Jun. 1, 2007, now U.S. Pat. No. 7,632,423 entitled "REACTIVE FINE PARTICLES", which in turn is a Division of U.S. patent application Ser. No. 10/762,508, filed Jan. 23, 2004, now U.S. Pat. No. 7,485,242 entitled "REACTWE FINE PARTICLES", both of which are incorporated herein by reference in their entirety.

FIELD OF THE INVENTION

The present invention generally relates to reactive fine particles and especially to fine latent curing agents; to a method for their production and to any use or end product comprising said novel particles or said method.

BACKGROUND OF THE INVENTION

Latent curing agents are solid low molecular weight chemicals that are dispersed in monomers, oligomers and polymers or mixtures thereof. Those chemicals are practically inactive at ambient temperature and become active at elevated temperatures. When activated, the dispersed solid particles of latent curing agent melt and react or initiate polymerization with polymers to form a cross-linked polymeric network.

A thermoset polymer is a polymer that doesn't melt when heated. The typical latent curing agents in thermosets, especially in epoxy systems, are solid fine powders that are dissolved in the epoxy matrix only above critical temperatures.

Epoxy based thermosets are cost effective matrices known for their low viscosity, excellent chemical and thermal properties, cost effectiveness, excellent adhesion to metals, ceramics and plastics, ease of application, low toxicity, wide spectrum of resins, diluents, modifiers and curing agents. The most popular epoxy resins for high performance applications are Diglycidyl ethers of bisphenol A (hereinafter 'DGEBA'), epoxy phenol Novolacs (hereinafter 'EPN'), epoxy cresol Novolacs (hereinafter 'ECN'), Diglycidyl ethers of bisphenol F (hereinafter 'DGEBF'), and bisphenol A based Novolacs.

Epoxy is the major building block of most high-end adhesives, legend marking inks, solder masks and hole plugging pastes. The most common latent curing agent for epoxy resins are urea derivatives, imidazoles, modified amines, and dicyandiamide (hereinafter 'DICY'), which is a commercially available ingredient in high-end electronic applications, such as adhesives, PCBs manufacturing, solder masks and hole plugging inks. DICY is characterized by a significant latency (pot life) and outstanding final properties of the cured matrix. It is activated at temperatures in the range of 160-170.degree. C. without a catalyst and in the range of 120 to 150.degree. C. with catalyst. The catalyst usually has negative impact on a pot life of the mixed formula.

Ink jet technology enables a very precise digital printing and provides for relatively small dots of liquid or molten material. Digital printing of high performance polymers adapted for marking, protection, coating, encapsulation and definition in electronic manufacturing has become a reality in recent years. The aforementioned ink is characterized by a low viscosity, less than 15 Cp at jetting temperature. When solid particles are used, their maximal size must be sub-micron, preferably less than 700 nm These particles are usually selected from fillers, pigments, curing agents, rheology modifiers and matting agents. Thermoset ink-jet inks, and particularly epoxy-containing ink-jet ink are latent high performance latent resins and particularly epoxy-containing particles of latent curing agent such DICY. Nevertheless, the finest commercially available DICY powders are characterized by an average particle size of 4 to 6 micron, thus their use in ink-jet application is avoided. A sub-micron latent curing agent is hence a critical component for high performance digital printing inks and its commercial availability as a long felt need.

SUMMARY OF THE INVENTION

A method for producing reactive fine particles, includes: admixing at least one latent curing agent selected from the group consisting of a urea derivative, an imidazole, a dicyaniamide (DICY), a mixture of any one or more thereof, and a precursor thereof, in a solvent to form a clear solution; spraying the clear solution onto at least one inorganic inert particle selected from the group consisting of a metal oxide, a mineral filler, a natural filler, and a mixture of any one or more thereof, the at least one inorganic inert particle having a specific surface area in the range of about 10 to about 50 m2/g; and removing the solvent to form reactive fine particles that includes a core of inert material coated by a coating layer that includes the at least one latent curing agent.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
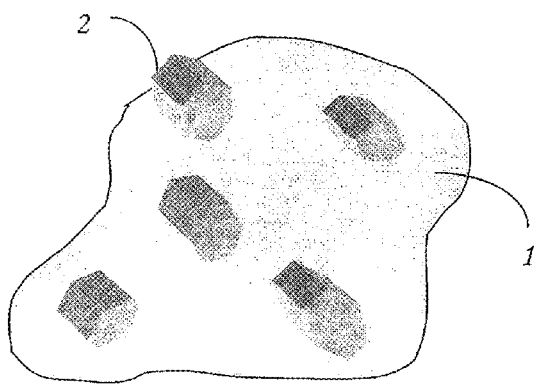
FIG. 1 schematically illustrates a top view of a portion of the reactive fine particle according to one embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide sub micron reactive particles, a method for their production and any use or end product comprising said novel particles or said method.

It is hence the object of the present invention to provide a cost effective and novel reactive fine particle; comprising one or more functional compounds A or its precursors having a maximal size lower 2 microns; adapted for synthesis, modification, curing, cross-linking, secession and/or initiating of polymerizations of polymers, and one or more inert particles B having a maximal size lower 2 microns carrying said functional compounds A at the outer surface and/or in its inner portion; wherein said compounds A to inert particles B weight ratio is ranging from 0.01A:100B to 50A:100B.

According to one embodiment of the present invention, the aforementioned reactive fine particle defined above are adapted for curing thermosetic polymers; wherein at least a portion of the functional compounds are curing agents or latent curing agents adapted to initiate cross linking and/or polymerization said thermoset polymers.

According to yet another embodiment of the present invention, a liquid thermosetting compound is hereto provided, and is adapted to be cured by the curing agents as defined above. This liquid thermosetting compound is comprised of the reactive fine particles A, inert particles B and various compounds selected in a non-limiting manner from thermosetting resins, thermoplastic resins, nano-particles, wetting agents, reactive diluents, impact modifiers, flexibilizers, heat stabilizers, surface tension modifiers, adhesion promoter, flame retardants, matting agents, rheology modifiers, dispersants or any combination thereof.

It is in the scope of the present invention wherein the aforementioned liquid thermosetting compound is further adapted for applications in microelectronic devices manufacturing selected from dielectrics, resistors, optical waveguides, conductive modules, capacitance layers, adhesives, protective coatings, encapsulants or any combination thereof. It is also in the scope of the present invention wherein the aforementioned liquid thermosetting compound is adapted for ink jet inks and/or ink jet printers; characterized by a viscosity lower 50 Cp at application temperature, surface tension lower 80 dyn/cm at application temperature, and glass transition temperature of cured ink of greater than 120.degree. C. The liquid thermosetting is preferably adapted to protect, mark, seal, encapsulate, define, and/or insulate electronic circuits from their environment and/or form aggressive media. More specifically, this liquid thermosetting compound according to yet another embodiment of the present invention is adapted to bond electronic, electric, optic and/or electro optic devices; to mark and notate features on the outer layers of PCB and/or the surface of discrete compounds; to define the feature of capacitors, resistors and/or conductors on a PCB layer.

It is a second object of the present invention to provide a cost effective and novel method for producing reactive fine particles as defined in any of the above. This method comprising inter alia the steps of (a) dissolving one or more functional compounds A or its precursors having a maximal size lower 2 microns in a solvent to form a clear solution; (b) admixing one or more inert particles B having a maximal size lower 2 microns with the solution obtained above to form a homogenized dispersion; (c) precipitating said functional compounds as a layer or in the form of small crystals onto and/or into the surface of said inert particles; (d) evaporating said solvent; (e) drying or concentrating the same; in the manner that reactive fine particles comprising said compounds A and inert particles B in a weight ratio which is ranging from 0.01A:100B to 50A:100B is obtained.

According to one embodiment of the present invention, the aforementioned method is provided wherein the deposition of the functional compounds A onto the inert particles B is provided by means selected from introducing of at least one another solvent to the said admixture; changing the temperature; pH shifting; altering electrolytes concentration, spraying agent solution on filler particles, or any combination thereof.

Additionally or alternatively, this method is additionally comprised of the step of stabilizing the obtained slurry by means of admixing a sufficient measure of dispersing agents and/or rheology modifiers. Moreover, this method is also provided useful wherein at least a portion of the precursors of the functional compounds A are admixed with the inert particles B at the reaction medium.

According to another embodiment of the present invention, the aforementioned method is provided for producing reactive fine particles, wherein the inert particles B are coated in at least a significant portion of their surface with functional compounds A. This method comprising inter alia the steps of (a) admixing at least one functional compound or its precursors in a solvent to form a clear solution; (b) spraying the same towards particles of the inert filler, having maximal particle size of 2 microns; and then, (c) removing said solvent, in the manner that reactive fine particles comprising dried inert particles coated by functional compounds is obtained. The method is also applicable wherein the reactive fine particles obtained comprising homogeneous or heterogeneous functional compounds compositions; and/or wherein monolayers or multilayers of functional compounds characterize the reactive fine particles obtained.

The term 'fine particle' is referring according to the preset invention to any small particle; compound, matrix or a composition encapsulated, barriered, crystallized or packed in a predetermined 3D environment characterized by an Maximal external diameter lower 2 micrometer. More practically the powder should have maximal aggregate (conglomerate) size of 700 nm.

The term 'reactive fine particle' is referring according to the preset invention to fine particle, either prime particle or aggregate or agglomerate as defined above, comprising at least one type of inert particle (hereinafter 'B') and at least type of functional component (hereinafter 'A'), wherein the maximal size of said particle is less than 2 micrometer (e.g., between 200 to 2000 nm). Component A is in physical communication with said inert particle B. It is further in the scope of the present invention wherein said reactive fine particle is comprised of various types of functional components (As) and inert particles (Bs), differ by their size, 3D structure, surface activity, reactivity, latency property, chemical composition, specific area or any other physical, chemical or biological properties. It is further in the scope of the present invention wherein said functional components (As) are only temporary comprised of at least a portion of the inert particles (Bs), in the manner the content of the said inert particles in the end product is significantly lower than its content at the beginning of the production process. It is still in the scope of the present invention wherein the nature of the said portion of inert particles is differing, altering or changing along the said production process.

According to the present invention, the term 'polymer' is refereeing hereinafter to any monomer, oligomer or polymer, their mixture, or to any combination thereof. Moreover, this term is also referring to block polymers, co-polymers and to all product and by-products of polymerization reactions.

According to one embodiment of the present invention, the aforementioned fine particles are comprised of at least one inert particle B that is either inorganic material, e.g., comprising mineral metal oxides, mineral natural fillers, synthetic metal oxides, ceramics, metallic compositions, glass or sol-gel matrices, chemical element or any mixture thereof, or organic material, such as cellulose, natural polymer, synthetic polymer or any mixture thereof. The said fine powder B is characterized by a specific surface area ranges from about 1 to 300 m.sup.2/g. According to yet another embodiment of the present invention, said powder is characterized by a specific surface area ranges from about 10 to about 50 m.sup.2/g.

The said fine particles may further comprised of at least one latent reactive composition A (e.g., a solid latent curing agent) which is dissolved in the solution in a weight ratio ranging from 0.01A to 100B; to 50A to 100B. According to yet another embodiment of the present invention, the said ratio is ranging form 5A to 100B; to 40A to 100B. It is acknowledged in this respect that additives of any type are potentially comprised in the said particle. Hence, presence of commercially available dispersing agents and rheology controlling agents is recommended to avoid agglomeration during concentration and storage.

The carrier inert particle B may be selected in a non-limiting manner form one or more of the following criteria: having a specific surface area between 1 to 300 m.sup.2/g., wherein the most favorable powder is the one characterized by a specific surface area ranging between 10 and 50 m.sup.2/g; since it is non-abrasive, and hence avoid damage to application tooling, especially to an ink-jet print head. Moreover, the carrier is preferably non-corrosive; it has a good thermal stability and chemical resistance; it is not reacting with the reactive particle and with the monomers, oligomers, polymers, solvents and/or additives in the ink. The inert particle B is further of sub-micron prime particle size, most favorably between 0.03 to 0.5 micron mean diameter; the maximal agglomerate size is 2 micron. It does not tend to deagglomerate or to disintegrate under milling; and/or it has a good compatibility with the monomers, oligomers, polymers, solvents and additives in the ink. Typical powders that meet these criteria are sulfates, e.g., BaSO.sub.4 or CaSO.sub.4, carbonates such as CaCO.sub.3, talc, kaolin, mica, silicates, and carbon black and synthetic silica.

The carrier medium is optimized for effectively dissolving the functional component A and is selected in a non-limiting manner form one or more of the following criteria: it is not toxic or is characterized by a very low toxicity; it is cost effective since it is at least partially re-usable and/or recycledable; it is a good solvent for the reactive latent curing agent id present; it has a low boiling point and a low specific heat of evaporation; and further, it is practically non reactive with either the inert or the reactive particles.

Reference is made now to FIG. 1, presenting a simplified top view reactive fine particles according to the present invention, wherein an relatively large inert particle B (1) is coated by a plurality of functional component A (see 2 for example). Said functional component (2) was crystallized on top the inert particle (1) and is characterized by a specific, defined and relative crystal 3D structure.

Figures 2, 3, 4:
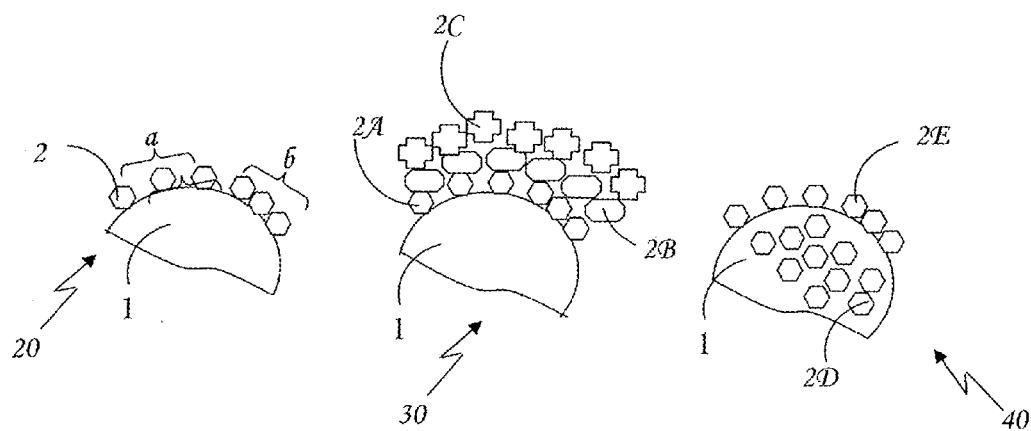
FIG. 2 schematically illustrates a lateral cross section of a portion of the reactive fine particle according to said embodiment of the present invention.
FIG. 3 schematically illustrates a lateral cross section of a portion of the reactive fine particle according to yet another embodiment of the present invention, wherein a multi-laminar heterogamous coating is provided.
FIG. 4 schematically illustrates a lateral cross section of a portion of the reactive fine particle according to another embodiment of the present invention wherein the reactive particles are located in the inner and the outer portion of the inert particle.

Reference is made now to FIG. 2, presenting a lateral cross-section of one portion of homogeneously coated reactive fine particle (20). Said portion comprising a central inert particle (1) and a plurality of functional components (see 2 for example). Said functional components may by either homogenous or heterogeneous nature, morphology or size, and may be set as an individual crystalline (portion a) or may be attached physically or chemically one to the others so a thin coating is provided (portion b).

Reference is made now to FIG. 3, presenting a lateral cross-section of one portion of heterogeneously coated reactive fine particle (30). Said portion comprising a central inert particle (1) and a plurality of functional components of type 2A (first and internal coating layer), type 2B (second coating layer) and type 2C (third and external coating layer). It is in the scope of the present invention wherein such a heterogeneous system is arranged as a plurality of layers in the manner at least one layer is homogeneous; a conglomerate comprising two or more types of reactive particles or any combination or mixture thereof.

Here, the three coating layer perform a contentious multi-component layer. Nevertheless, a porosive or other discontinuous layered or embedded structures are easily to be tailor made according to the description of the present invention.

Reference is made now to FIG. 4, presenting a lateral cross-section of one portion of homogeneously embedded reactive fine particle (40). Said portion comprising a central inert particle (1) and a plurality of functional components, some are entrapped, immobilized, encapsulated, soaked, doped or bonded into the inner portion of the inert particle (2D); and some are coated on the outer rim of the inert particle (2E). A reactive fine particle incorporating either homogenous or heterogeneous systems located in the inner portion, outer portion or a combination thereof is also possible according to the description of the present invention.

Figure 5:
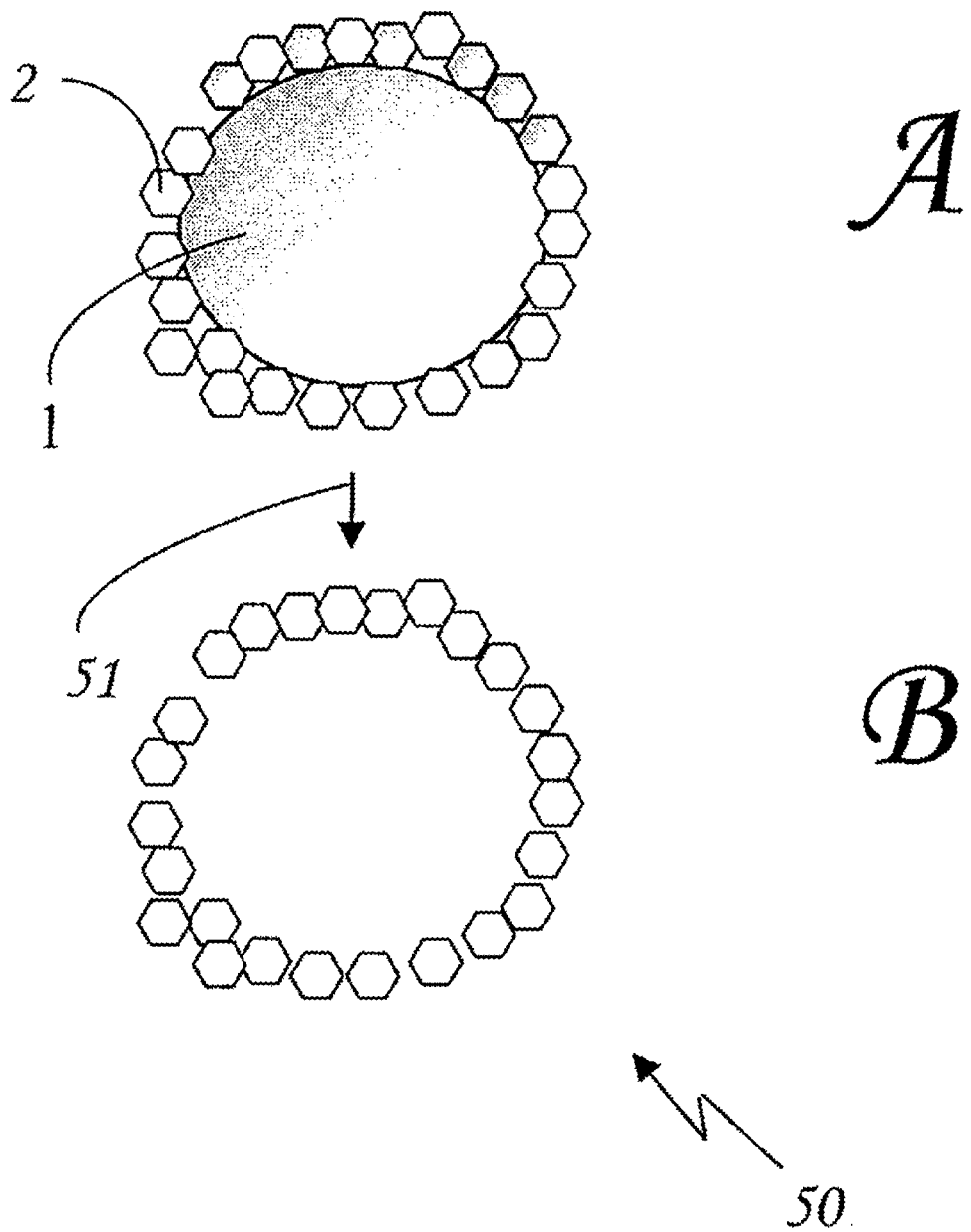
FIG. 5 schematically illustrates a lateral cross section of a reactive fine particle according to another embodiment of the present invention, wherein at step A is comprises a physical support of the inert particle, and at the subsequent step B is comprises only the reactive particles.

Reference is made now to FIG. 5, presenting a lateral cross-section of one portion of homogeneously coated reactive fine particle (50). Illustration 5A presents the said portion, wherein it is initially comprised of a central inert particle (1) and a plurality of functional components (see 2 for example). Illustration 5B however presents the said portion, whereat the inert particle is removed (51) in the manner it is currently comprised of the thin layer of the functional components. The removal of the said inert particle (1) in step (51) is provided by many known techniques of the art, such as physical treatments (temperature change, UV emission, sonication etc.), chemical reactions (pH shifting in the manner solubility is altered, oxidation, liquid-liquid extraction, etc), controlled biological response etc. Such a vehicle-like vesicle may be further processed in any manner.

It is well acknowledged in this respect that the precursors of the reactive fine particles are being admixed with the filler at the reaction medium and not the reactive fine particles themselves. Reference for that is made by U.S. Pat. No. 6,235,865 to Shimizu et al., which discloses phosphonium borate compounds useful as a curing catalyst in epoxy and other resin compositions, and U.S. Pat. No. 6,492,437 to Musa et al., which teaches for solvent-based processes for producing latent curing catalysts without causing an extreme exotherm.

It is in the scope of the present invention to provide a useful method for the production of the reactive fine particles A as defined in any of the above. Hence, the general approach for the production of the reactive fine particles according to the present invention is a simple process comprised inter alia of the following five steps: (a) dissolving at least one reactive fine particles or its precursors, characterized by fine particles, in a solvent to form a clear solution; (b) admixing an inert filler B having maximal particle size of 2 microns with the solution obtained above to form a homogenized dispersion; (c) precipitating said reactive fine particles as a layer or in the form of small crystals onto said filler surface and/or inside the internal porosity of said filler; (d) evaporating said solvent; and lastly, (e) drying or concentrating the same.

Additionally, a method for producing coated filler particles is hereto provided. Those filler particles B are coated the reactive fine particles A in at least a significant portion of their surface. Said method comprising inter alia the steps of admixing at least one reactive fine particle or its precursors in a solvent to form a clear solution, and then spraying the same towards particles of the inert filler, having maximal particle size of 2 microns. After removing said solvent, dried coated filler is obtained. The spraying is referring for any applicable means for jetting components A over components B, such as using an atomizer and a stream of hot carrier of air or gas.

It is in the scope of the present invention wherein sprayed suspension or solution comprising the reactive fine particle A or its precursors is sprayed onto a stream of B powder so a 0.01A:100B to 50A:100B coated dispersion is provided.

It is further acknowledged in this respect that since the surface area the inert particle B is high and the amount of the functional component A is limited, crystals or films of functional component A are small or thin so crystallization of particles to a non-desired big size is effectively limited.

The presence of organic dispersant (e.g., dispersing agent), assures that the particles are covered by a layer that minimize the tendency to re-agglomerate. The powder or slurry is then milled in pearl mill, sand mill or attritor in the presence of additional amount of dispersing agent to a smooth paste, so a fine particles are obtained, such as fine particles carrying a latent curing agents. Polymer resin (epoxy for example), and rheology modifier (e.g., fumed silica) can be incorporated in order to control rheology and prevent re-agglomeration.

It is in the scope of the present invention wherein the reactive fine particles as defined in any of the above are applicable in the various electronic technologies, especially for electronic and/or microelectronic and/or optical components or devices manufacturing processes suitable to be applied by ink jet technology. More specifically, the electronic technologies defined above may be selected from solder masks, dielectrics, resistors, optical waveguides, conductive modules, capacitance layers, adhesives, protective coatings, encapsulants or any combination thereof.

EXAMPLE 1

To prepare reactive fine particles useful as latent curing agents, the following formulation was prepared. The following ingredient where effectively admixed: 6 parts EPN (EEW=174); 24 parts DGEBF (EEW=170); 5 parts acrylated oligomers having functionality of 1 and viscosity of 5 Cp; 3 parts acrylated oligomer having functionality of 2; 3 parts of acrylated oligomer with functionality of 3; one part acrylated epoxy; 4 parts free radical photinitiator; 9 parts $BaSO_4$ inert filler having particle size of 40 nm and surface area of 30 $m^2/g$; 5 parts of dispersant; 0.2 parts organic peroxide; 25 parts glycol ether solvents mixture; 2.5 parts micronized DICY having average article size of 6 microns; 8 parts of melamine formaldehyde (MF) resin; 0.5 parts of wetting agents. The formulation was milled in pearl mill to disperse the solids. Ink jet ink was prepared from the same.

EXAMPLE 2

To enable continuous filtration of the ink obtained above, as required in industrial ink jet machines and enable introducing into the print head, a process of deposition of DICY on particles smaller than 2.mu.m was developed. DICY was slowly precipitated onto $BaSO_4$ fine particles from saturated organic or aqueous solution, and stabilized by reology additives and dispersant. The obtained slurry was milled with epoxy resins, dispersants and solvents to form an ink precursor. The resins and dispersant keep the rheology in a state that blocks re-agglomeration and DICY crystals growth Milling was performed in a Dyno Mill, (Bead size 0.4 mm, 2000 RPM, Retention time of about 12 minutes), until this low viscosity concentrate could be easily filtered through 2.mu.m glass fiber filter.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. Reactive fine particles that are produced by a method that comprises: dissolving at least one latent curing agent selected from the group consisting of a urea derivative, an imidazole, a dicyandiamide (DICY), a mixture of any one or more thereof, and a precursor thereof, in at least one solvent to form a curing agent solution; and providing at least one inorganic inert particle comprising one or more members selected form the group consisting of a metal oxide, a mineral filler, a natural filler, and a mixture of any one or more thereof, the at least one inorganic inert particle having a specific surface area in the range of about 10 to about 50 m2/g; and precipitating the at least one latent curing agent onto the at least one inorganic inert particle to form reactive fine particles having a maximal particle size of less than 2 microns; wherein the at least one latent curing agent is entrapped, immobilized, encapsulated, soaked, doped or bonded into the inner portion of the at least one inorganic inert particle or the at least one latent curing agent is coated on the outer surface of the at least one inorganic inert particle, and a weight ratio of the at least one latent curing agent to the at least one inorganic inert particle is in a range of 0.01:100 to 50:100.

2. A method for producing reactive fine particles, comprising:
admixing at least one latent curing agent selected from the group consisting of a urea derivative, an imidazole, a dicyaniamide (DICY), a mixture of any one or more thereof, and a precursor thereof, in a solvent to form a clear solution;
spraying the clear solution onto at least one inorganic inert particle selected from the group consisting of a metal oxide, a mineral filler, a natural filler, and a mixture of any one or more thereof, the at least one inorganic inert particle having a specific surface area in the range of about 10 to about 50 m2/g; and
removing the solvent to form reactive fine particles comprising a core of inert material coated by a coating layer comprising the at least one latent curing agent;
wherein the reactive fine particles have a maximal size that is less than 2 micrometer.

3. The method according to claim 2, wherein the coating layer comprises monolayers or multilayers of the at least one latent curing agent.

4. The method according to claim 2 wherein the reactive fine particles have a maximal size that is between 200 to 2000 nanometers.

5. The method according to claim 2, comprising admixing at least one latent curing agent selected from the group consisting of a urea derivative, a dicyaniamide (DICY), a mixture of any one or more thereof, and a precursor thereof, in the solvent to form the clear solution.

6. The method according to claim 2, comprising removing the solvent to form reactive fine particles comprising a core of inert material coated by a coating layer comprising a plurality of functional components, some functional components are soaked or doped into an inner portion of the core of inert material.

* * * * *